US012698644B2

(12) United States Patent
Stucker

(10) Patent No.: US 12,698,644 B2
(45) Date of Patent: Aug. 4, 2026

(54) GATE POST ADJUSTMENT INSERT

(71) Applicant: Justin D. Stucker, Kuna, ID (US)

(72) Inventor: Justin D. Stucker, Kuna, ID (US)

( * ) Notice: Subject to any disclaimer, the term of this patent is extended or adjusted under 35 U.S.C. 154(b) by 324 days.

(21) Appl. No.: 18/503,070

(22) Filed: Nov. 6, 2023

(65) Prior Publication Data

US 2024/0151062 A1 May 9, 2024

Related U.S. Application Data

(60) Provisional application No. 63/382,406, filed on Nov. 4, 2022.

(51) Int. Cl.

*E04H 17/02* (2006.01)
*E04H 17/26* (2006.01)
*E06B 11/02* (2006.01)
*E04H 17/20* (2006.01)

(52) U.S. Cl.

CPC ............ *E04H 17/261* (2013.01); *E06B 11/02* (2013.01); *E04H 17/21* (2021.01)

(58) Field of Classification Search

CPC ........ E04H 17/261; E04H 17/21; E06B 11/02
See application file for complete search history.

(56) References Cited

U.S. PATENT DOCUMENTS

| | | | | |
|---|---|---|---|---|
| 793,485 | A * | 6/1905 | Weston | E06B 11/04 16/86.2 |
| 6,073,396 | A * | 6/2000 | Kietzmann | E06B 11/04 16/237 |
| 6,978,576 | B2 * | 12/2005 | Shirk | E05D 3/022 220/908 |
| 9,976,298 | B2 * | 5/2018 | Bergman | E04B 1/486 |

* cited by examiner

*Primary Examiner* — Grant Moubry
(74) *Attorney, Agent, or Firm* — Scott D. Swanson; Shaver Swanson

(57) ABSTRACT

A fence post insert for adjusting a gate. The fence post insert allows for increasing or decreasing tension on a tensioning device within the gate post to adjust the tension on the gate post. This tension allows the gate post to move away from or toward the gate causing the gate to pull away from or move toward the opposing post or opposing gate section. The gate post insert allows for the adjustment of a gate by correcting a gate that is either too close or too far from the opposing side of the gate, typically either another post or a second gate, such as in double gate.

20 Claims, 12 Drawing Sheets

GATE POST ADJUSTMENT INSERT

CROSS-REFERENCE TO RELATED APPLICATIONS

This application claims the benefit of U.S. Provisional Application No. 63/382,406, filed Nov. 4, 2022 the disclosure of which is incorporated by reference.

FIELD OF THE INVENTION

The disclosure generally relates to the field of fence manufacturing and assembly. Particular embodiments relate to gate post inserts.

BACKGROUND

Background Information Gates are typically utilized to allow for ingress and egress to and from a fenced area. A gate assembly typically utilizes two posts or poles, with a gate extending between the posts. The gate may be a single gate, with a single gate panel extending between the posts with the gate attached by a hinge to a hinge post. The gate panel swings on the hinges toward and away from a latch post. Typically the latch post has a latch to secure the gate closed. A double gate typically utilizes two hinge posts, with two gate panels forming the gate. One gate panel is attached to a first gate post, and a second gate panel is attached to the opposing post. The gate panels typically meet between the two hinge posts, and swing away from one another thus opening the gate.

Typically, when a gate is constructed, the hinge post and latch post are anchored into the ground. The anchor may be done by a variety of structures and assemblies depending on the type of fence. The fence may be constructed using metal, vinyl, wood, or other material or a combination of materials. In several types of gates, the hinge post is formed of a hollow material, such as a hollow vinyl or hollow metal. An insert is typically positioned within the hinge post to provide support to the hinge post for supporting the swinging gate.

Gates may be constructed in a wide variety of widths depending on the design of the gate. However, with a typical gate design, the entire weight of the gate is on the hinge post. The weight of the gate coupled with the continued forced of the gate swinging open and swinging closed provides a force on the hinge post that may cause the hinge post to bend, sink and/or lean. When the gate post is no longer plum, the gate positioning relative to the latch post, latch post, or other gate may be off, causing the gate to align poorly with the latch or to even prevent closing by allowing the gate to hit or otherwise be blocked by the latch post or other gate. Accordingly, what is needed is an improved methodology for adjusting a gate that is by adjusting the plumed hinge post.

SUMMARY

While the presently disclosed inventive concept(s) is susceptible of various modifications and alternative constructions, certain illustrated embodiments thereof have been shown in the drawings and will be described below in detail. It should be understood, however, that there is no intention to limit the inventive concept(s) to the specific form disclosed, but, on the contrary, the presently disclosed and claimed inventive concept(s) is to cover all modifications, alternative constructions, and equivalents falling within the spirit and scope of the inventive concept(s) as defined herein.

What is disclosed is an adjustable post insert for use with the hinge post of a gate. The adjustable post insert provides the ability to re-level/re-plumb or adjust the gate post as needed to return the post to plum. Some gates may have two opposing hinge posts with two opposing gate sections. The disclosed technology accommodates for a loose gate insert, shifting soil, a post that has fallen out of plum, to adjust and correct gaps between a gate and one more post and adjusting gaps where double gates meet.

The gate insert utilizes a rigid support body that extends within the fence post. The body is formed to provide support to the hinge post. The body may be in a variety of shapes to provide support to the hinge post depending on the shape of the hinge post. For example, with a hinge post having a square cross section, a preferred embodiment of an insert body would be in a U-shaped channel. The U-shaped channel having two opposing sides, a bottom, and an open top. The body has a relief positioned in the body. In the embodiment of the U-shape body, there is a relief on each of the opposing arms of the U-shaped channel. The floor of the U is shown in the figures as being an un cut section, or non-relief section, effectively acting as a hinge on which the upper insert body pivots relative to the lower. Alternatively a literal hinge can be used for this connection.

A tensioning mechanism extends between the body sections on opposing sides of the relief. The tensioning mechanism provides support to the upper insert body section and lower insert body section to secure the two sections in place relative to one other. In other words, the tensioning mechanism provides rigidity of the U-shape body to support the integrity of the relief. Tightening of the tensioning mechanism causes the relief width to decrease, pulling the top of the hinged post toward the side of the body having the relief. A variety of mechanisms can be utilized to allow for a tensioning mechanism to apply tension or compression the relief. In a first embodiment, a plate extends between the opposing arms of the U-shape above the relief. One or more tensioning rods extends from this upper plate to a lower plate positioned below the relief. The upper and lower plate are positioned adjacent to the open top of the U-shape. The rods are configured to thread into either the top plate or the bottom plate. Preferably a bolt head or nut is positioned on the top plate operatively connected to the rod, such that rotation of the bolt or nut causes tightening of the tensioning mechanism. Alternatively, rod sleeves may be utilized in lieu of one or more of the plates. The tensioning mechanisms may be positioned with the operational end approximate to the end of the body to facilitate access from the top of the gate hinge post. Alternatively, the mechanism may be positioned approximate to the relief. In this construction, an elongate tool would be used to facilitate adjustment of the tensioning mechanism. The relief allows the two sections of the insert body to effectively hinge toward or away from each other, adjusting the positioning of the upper insert body to the lower insert body, and causing the gate to move toward or away from the opposing post or gate. Alternatively a literal hinge may be used to connect the upper and lower insert body sections of the insert, with the body sections rotating on the hinge to adjust the gate insert and thus the gate post/gate.

Still other features and advantages of the presently disclosed and claimed inventive concept(s) will become readily apparent to those skilled in this art from the following detailed description describing preferred embodiments of the inventive concept(s), simply by way of illustration of the embodiments contemplated by carrying out the inventive concept(s). As will be realized, the inventive concept(s) is capable of modification in various obvious respects all without departing from the inventive concept(s). Accordingly, the drawings and description of the preferred embodiments are to be regarded as illustrative in nature, and not as restrictive in nature.

DETAILED DESCRIPTION OF FIGURES

Figure 1:
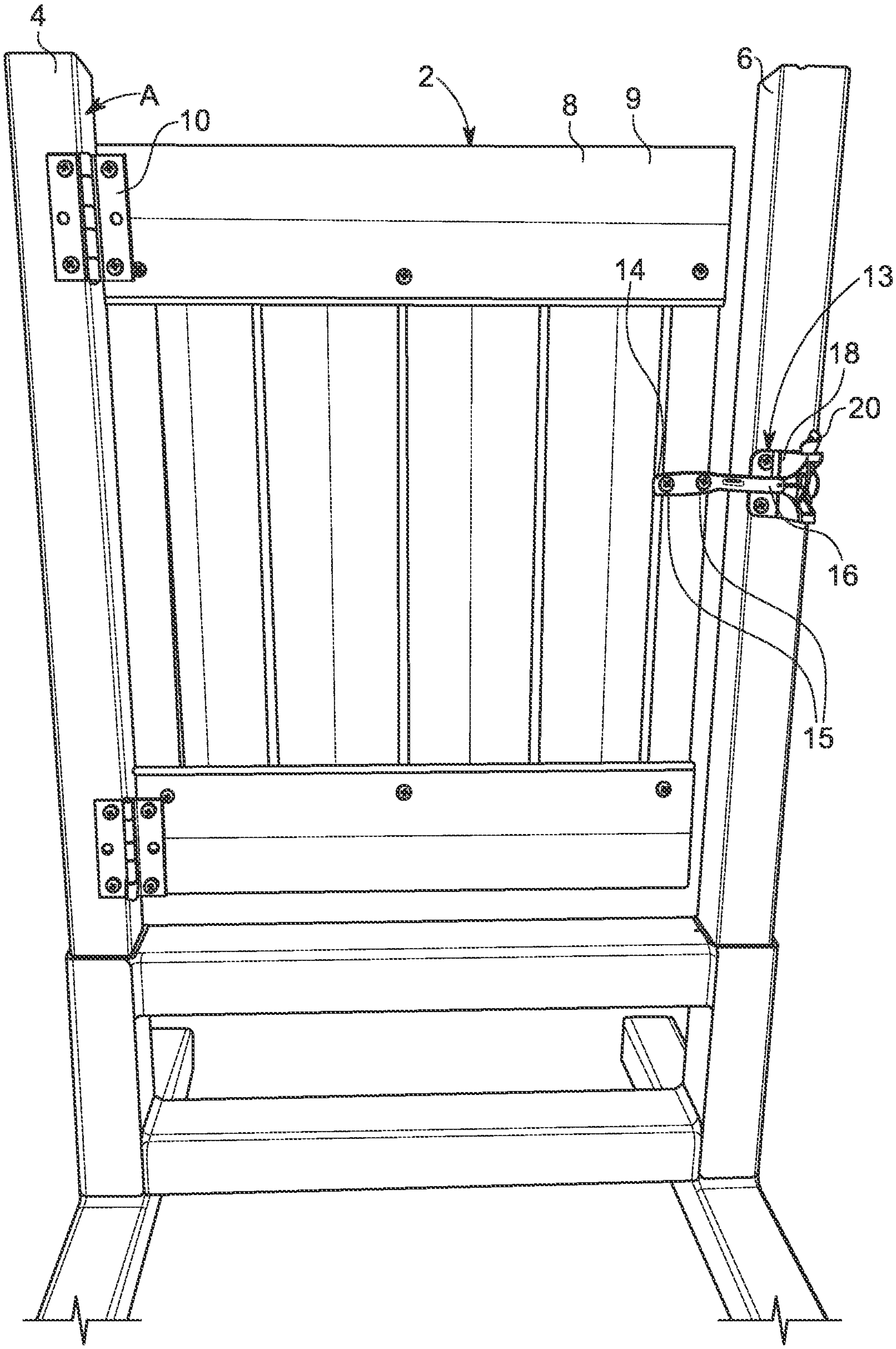
FIG. 1 is a front perspective view of an embodiment of the invention.

While certain exemplary embodiments are shown in the Figures and described in this disclosure, it is to be distinctly understood that the presently disclosed inventive concept(s) is not limited thereto but may be variously embodied to practice within the scope of this disclosure. From the foregoing description, it will be apparent that various changes may be made without departing from the spirit and scope of the disclosure as defined herein In the following description and in the figures, like elements are identified with like reference numerals. The use of "e.g.," "etc," and "or" indicates non-exclusive alternatives without limitation unless otherwise noted. The use of "including" means "including, but not limited to," unless otherwise noted.

FIG. 1 illustrates a perspective view of a model gate assembly. A gate 2 extends between hinge post 4 and latch post 6. The gate is attached to the hinge post by hinges 10. The gate panel 8 extends toward the latch post 6 from the hinge post. In the depicted assembly, the gate is configured to swing inward toward the reader. A latch assembly 13 is connected to the latch post 6. The latch assembly utilizes a male component 14 having a base connected to the gate panel by fasteners 15. A male section 16 extends away from the gate panel. A female latch member 18 is connected to the latch post. The female latch member has a retainer portion 20 configured for retaining the male portion 16 of the latch assembly in the female portion thus preventing the gate from swinging open when the latch is engaged.

A problem with many gate assemblies is that the weight of the gate panel 8 provides a downward force that may cause the hinge post 4 to lean inward as shown by arrow A. This may cause the male section of the latch to misalign with the female section, and even to be as severe as the top corner 9 of the gate panel having protruded so far that the latch post blocks the swing of the gate.

Figure 2:
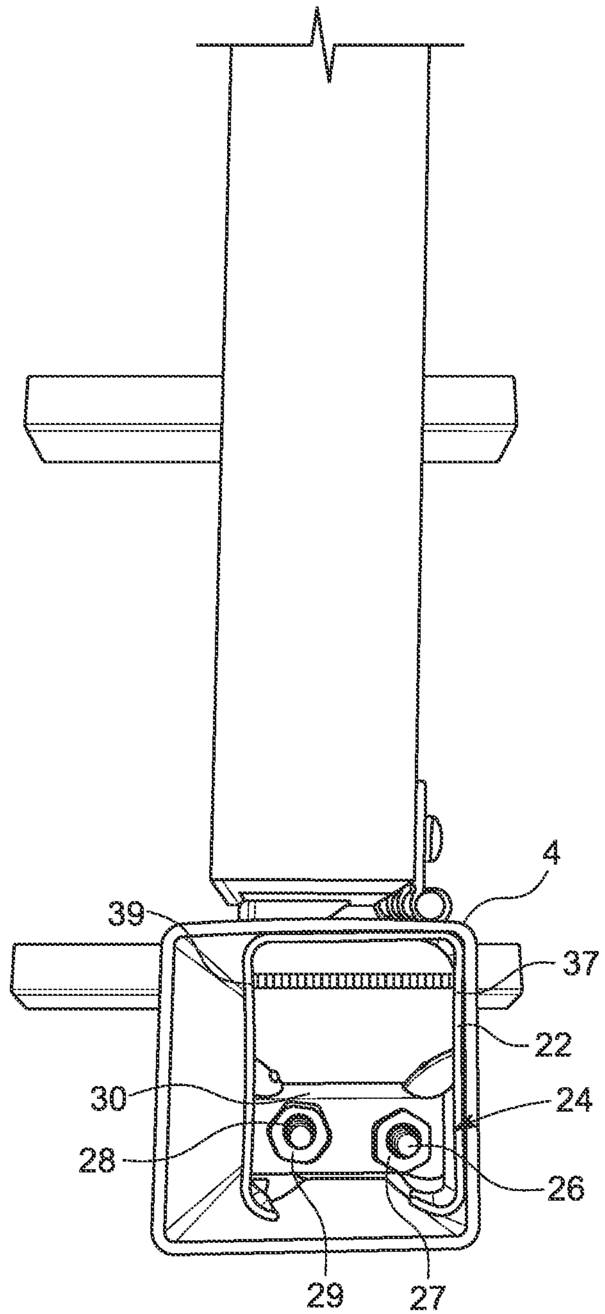
FIG. 2 is a top view of an embodiment of the embodiment of FIG. 1.

FIG. 2 illustrates a top view of the latch post with the top of the latch post removed. An improved insert for facilitating the plum of the latch post is provided. A standard U-shaped channel body 22 is positioned within the hollow hinge post 4. The U-shaped channel 22 extends into and along the length of the latch post. The U-shaped channel provides rigidity in the depicted vinyl post and vinyl gate structure. A tensioning mechanism 24 is provided. The tensioning mechanism serves to facilitate the adjustment of the top of the latch post away from the top of the hinge post. Two threaded rods 26, 28 extend from the upper plate 30 toward a lower plate (illustrated in sequential Figures), two nuts 27, 29 are provided on the threaded rods to facilitate tightening and loosening of the rods.

Figure 3:
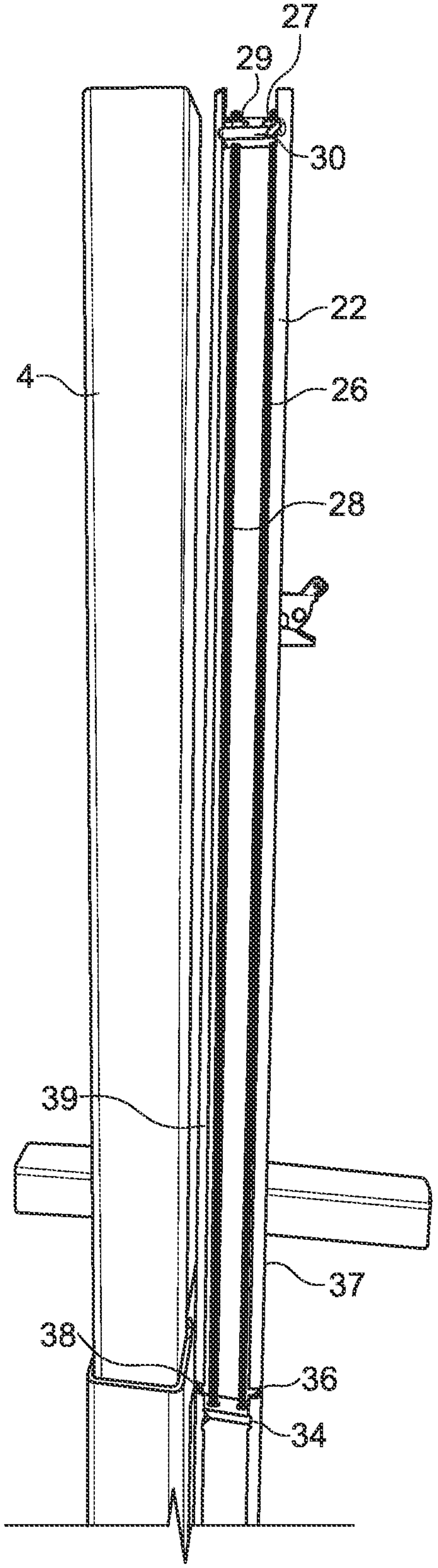
FIG. 3 is a partially disassembled side view of the embodiment of FIG. 1 illustrating the internal components of the embodiment.

FIG. 3 illustrates the insert 22 of FIG. 2 removed from the hinge post 4 and positioned alongside the hinge post. The two threaded rods 26, 28 are shown extending along the length of the U-shaped channel 22. Two reliefs 36,38 are shown in the opposing arms 37, 39 of the U-shaped channel. The rods extend from the upper plate 30 to a lower plate 34 attached to the U-shaped channel below reliefs 36, 38 positioned in the arms of the U-shaped channel. The rods are connected to the upper plate 30 and lower plate 34 so as to be functionally connected to the U-shaped channel on opposing sides of the upper plate and lower plate. Tightening and loosening of the nuts 27, 29 pulls the upper and lower plate together or pushes the upper and lower plate apart causing the reliefs 36, 38 to narrow or enlarge. The reliefs are positioned in the hinge post such that narrowing or enlarging the reliefs causes the upper end of the hinge post to move toward or away from the top of the latch post causing the post and gate to be adjusted relative to the latch post.

Figure 4:
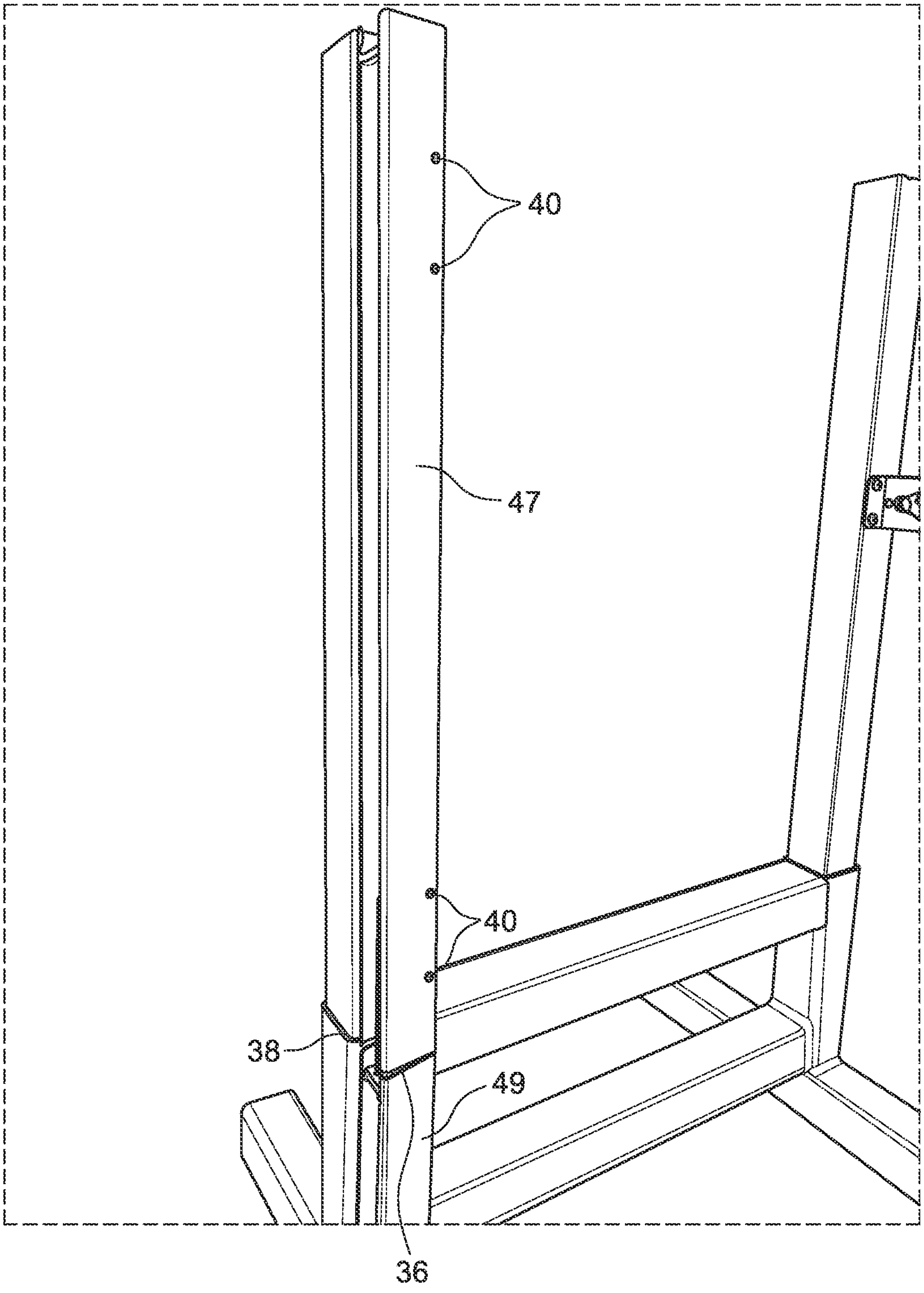
FIG. 4 is a partially disassemble perspective view of the embodiment of FIG. 1 illustrating the internal components of the hinge post of the embodiment of FIG. 1.

FIG. 4 illustrates a perspective view of the insert showing the positioning of the relief 36 relative to the adjustable upper section 47 of the insert and the static or fixed section 49. Fastener holes 40 are provided which fasten the latches shown in FIG. 1 to the hinge post. The gate is connected to the upper insert body. The upper insert body is connected to the lower insert body at hinge point 59, which can be a literal hinge. The hinge point 59 in the depicted embodiment is an uncut section of the channel that remains after the relief has been positioned in the channel. Alternatively a hinge can be utilized to connect the upper and lower insert body sections.

Figure 5:
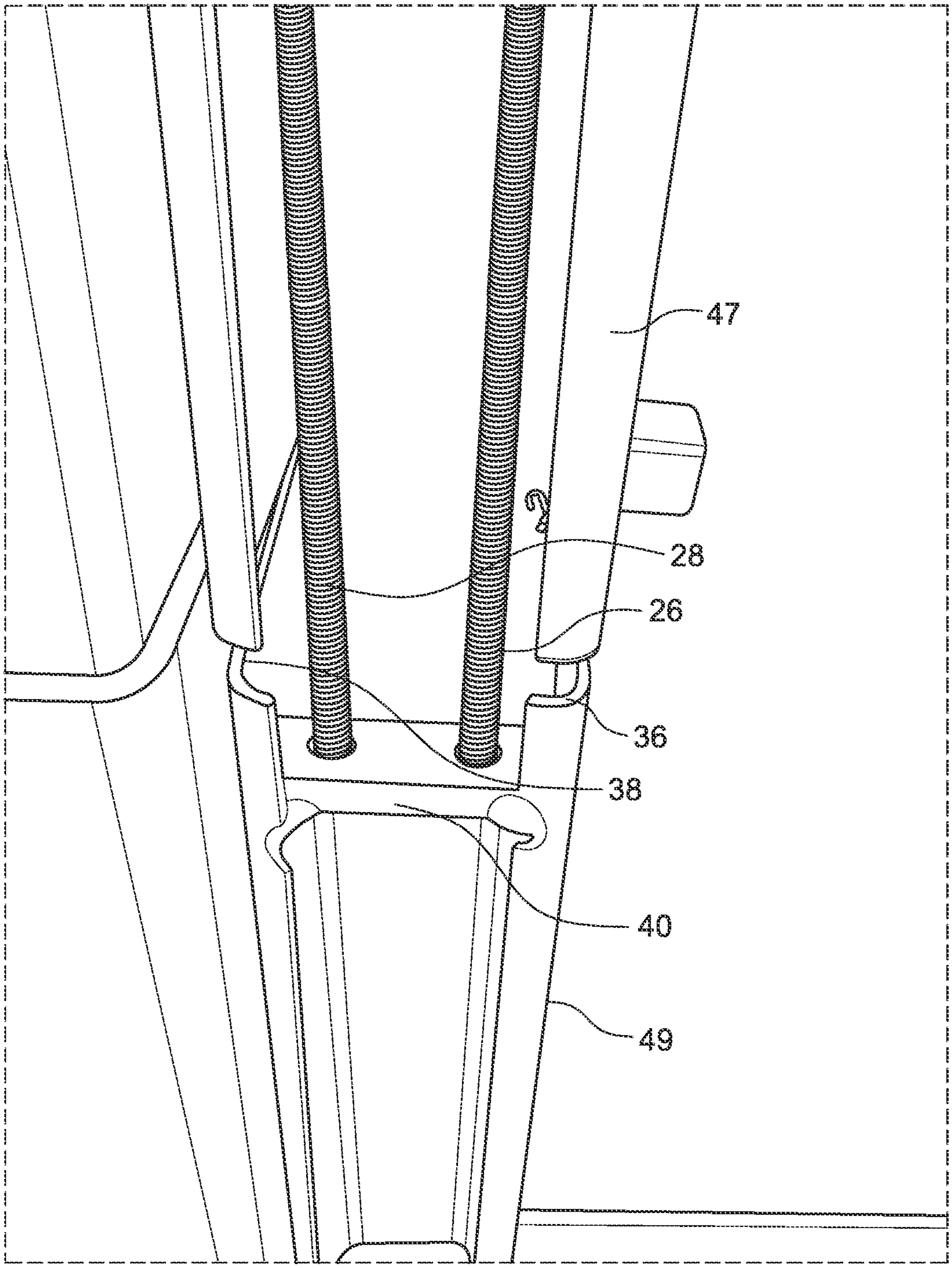
FIG. 5 illustrates the lower portion of the internal components of the hinge post of the embodiment of FIG. 1 positioned next to the post sleeve.

FIG. 5 illustrates a magnified view of the reliefs, lower plate 40, and lower ends of the threaded rods 26, 28. In the depicted embodiment, the threaded rods are connected to the lower plate such that rotation of the threaded rods pulls the upper section 47 of the insert toward or away from the lower section 49 of the insert.

Figure 6:
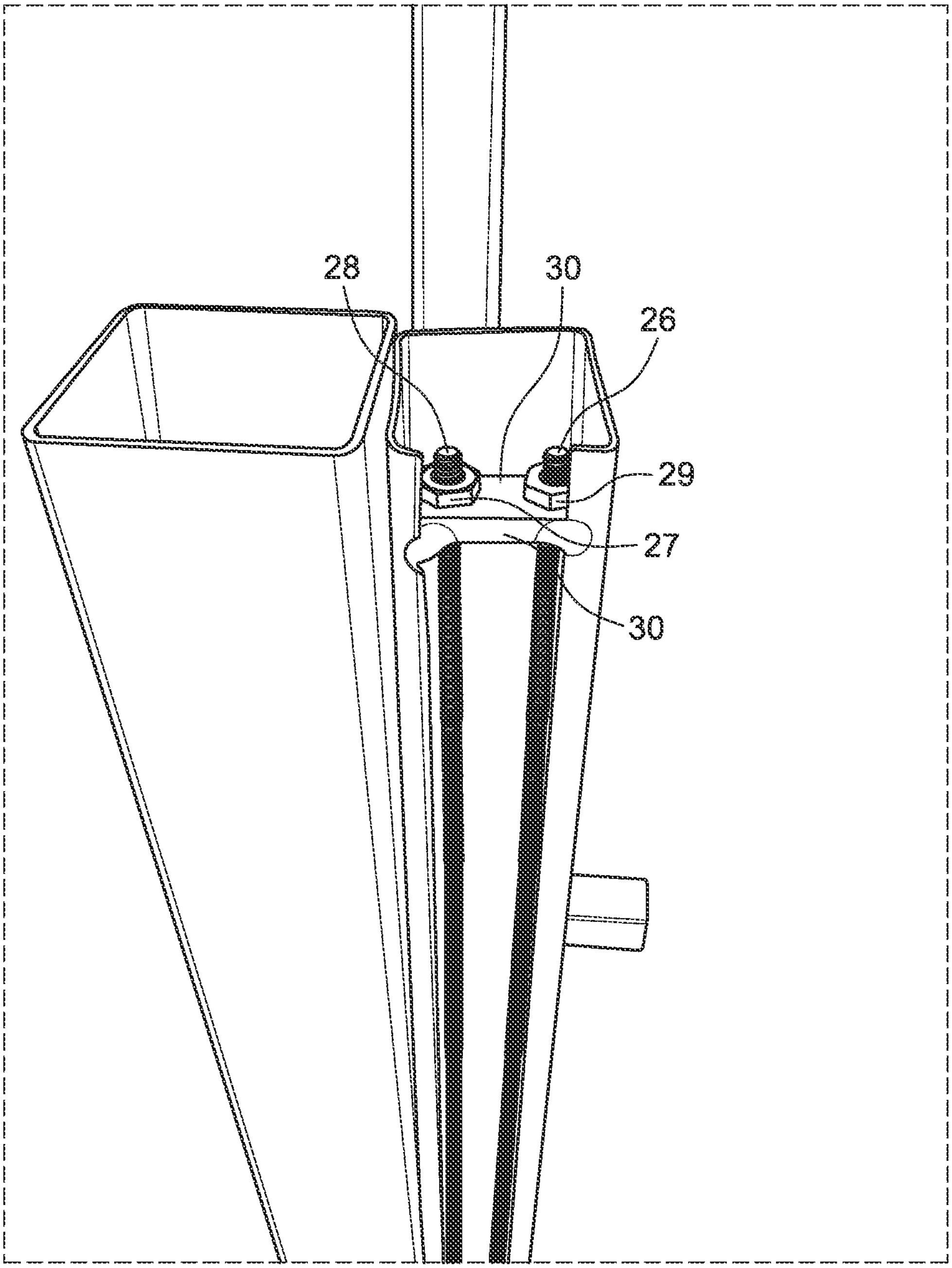
FIG. 6 illustrates the top portion of the internal components of the of the hinge post of the embodiment of FIG. 1 positioned next to the post sleeve.

FIG. 6 illustrates the upper plate 30 and upper ends of the threaded rods 26, 28. The rotation of the nuts on the threaded rod causes the upper plate 30 to be pulled downward toward the lower plate causing the reliefs in the insert to close. This adjustment pulls the upper end of the hinge post away from the latch post.

Figure 7:
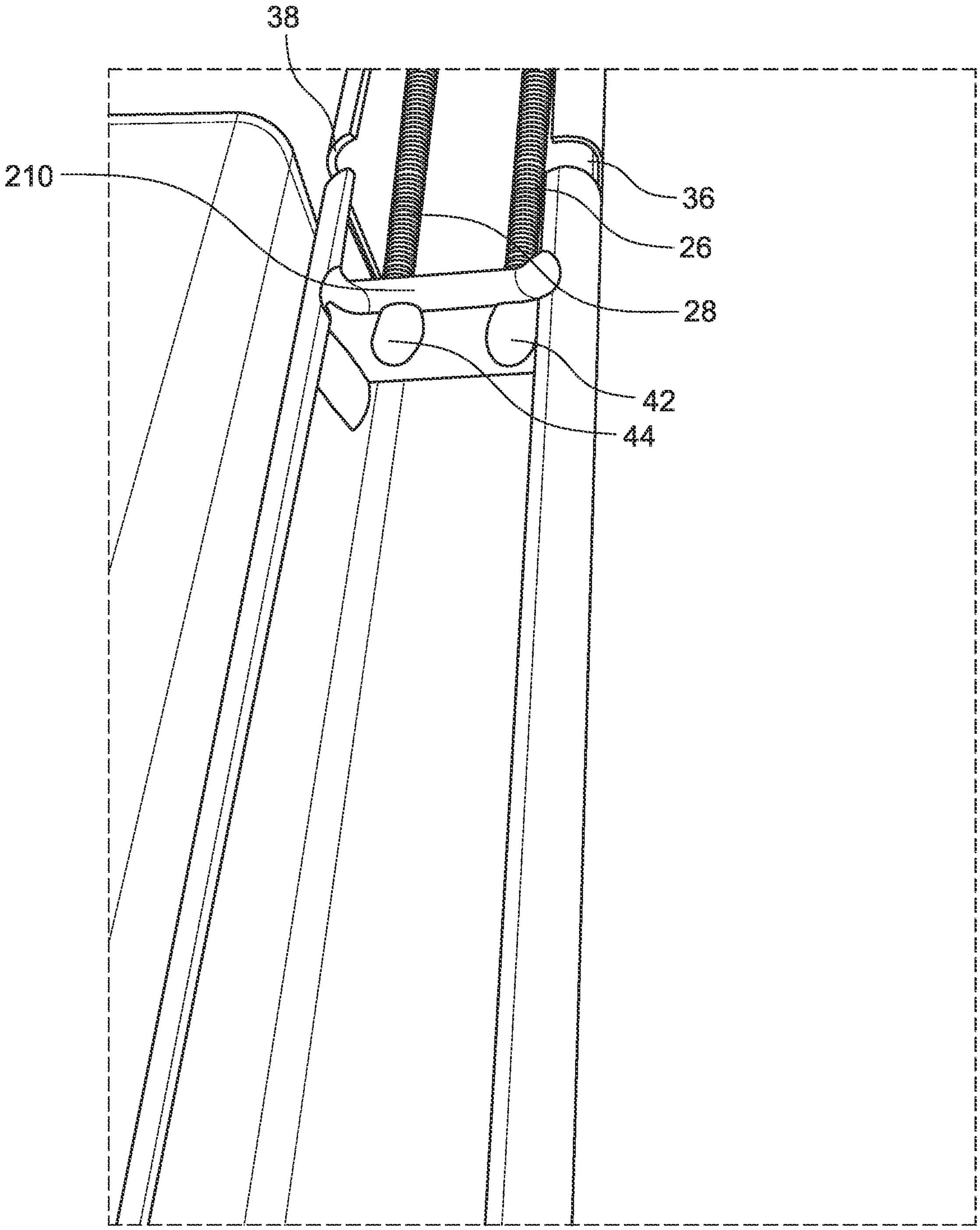
FIG. 7 illustrates a second view of the lower portion of the internal components of the hinge post of the embodiment of FIG. 1.

FIG. 7 illustrates the lower plate 40 and the connected ends 42, 44 of the threaded rods 26, 28.

FIGS. 8-12 illustrate additional embodiments of the invented concepts disclosed herein.

Figure 8:
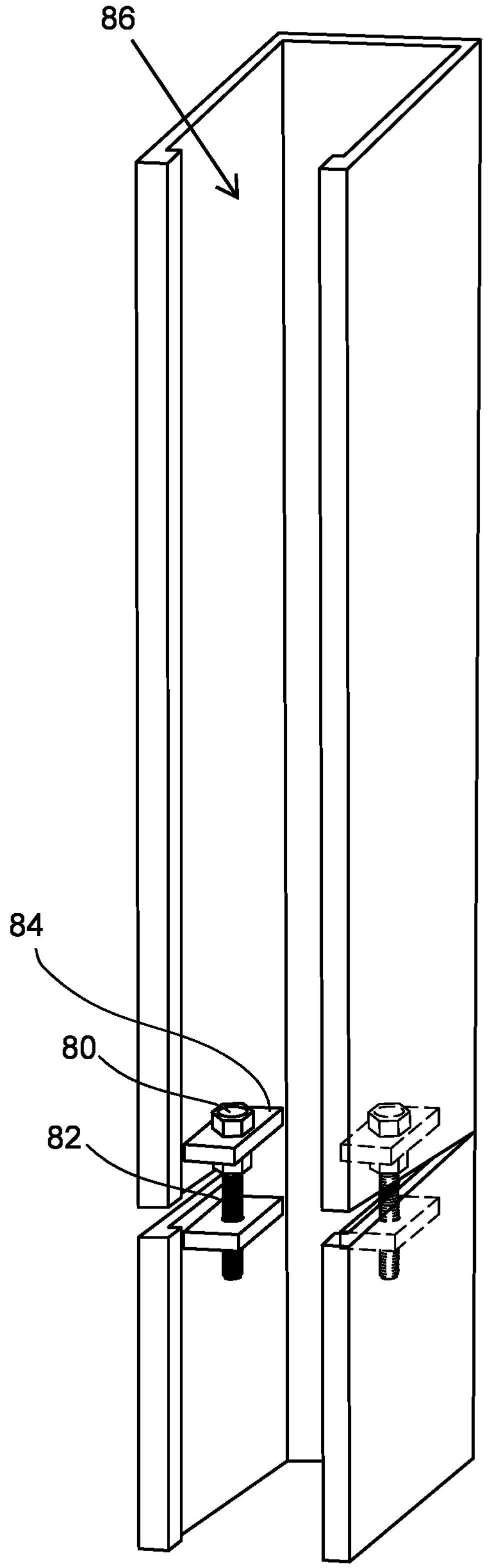
FIG. 8 illustrates a second embodiment of the internal components of the hinge post.

FIG. 8 illustrates the tensioning mechanism positioned adjacent to the relief. The upper plate and lower plate are comprised of two plates each with a threaded rod extending between. A hexagonal shaped head 80 is positioned on top of the rod 82. The upper plate 84 does not extend entirely across the channel and instead a second plate (not shown) and second tensioner mechanism (not shown) is preferably positioned on the opposite arm of the U-shaped channel. A tensioning tool may be inserted through the top 86 of the U-shaped channel and extend down to reach the hexagonal head.

Figure 9:
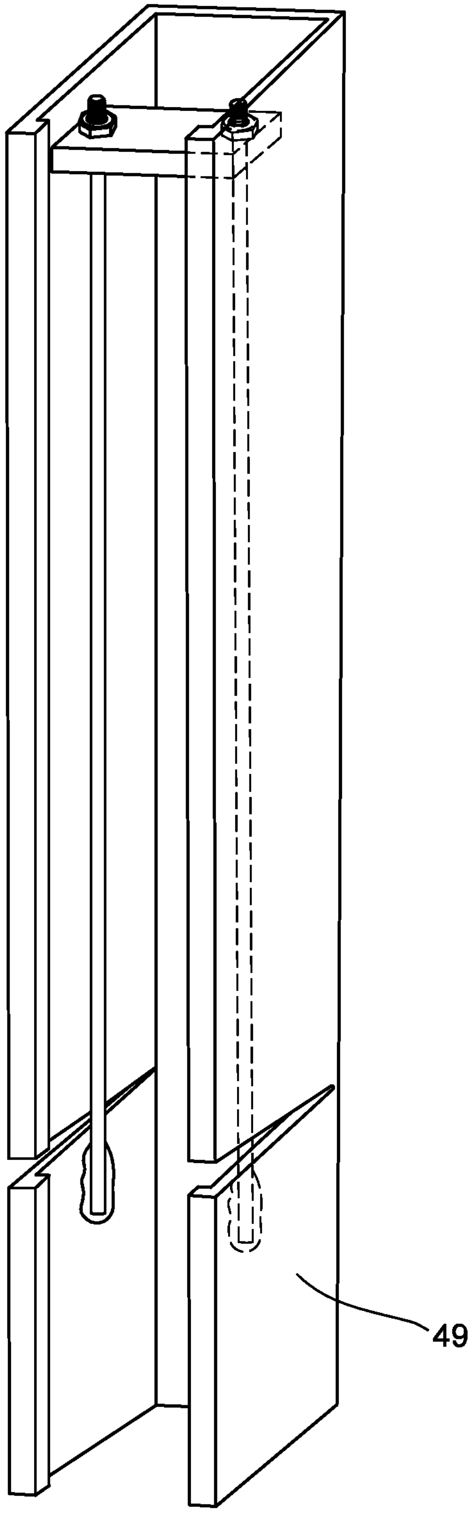
FIG. 9 illustrates a perspective view of a third embodiment of the internal components of the hinge post and having a fixed rod with an adjustable nut.

FIG. 9 illustrates an alternative embodiment in which the threaded rods are welded 51 to the sides of the lower channel 49.

Figure 10:
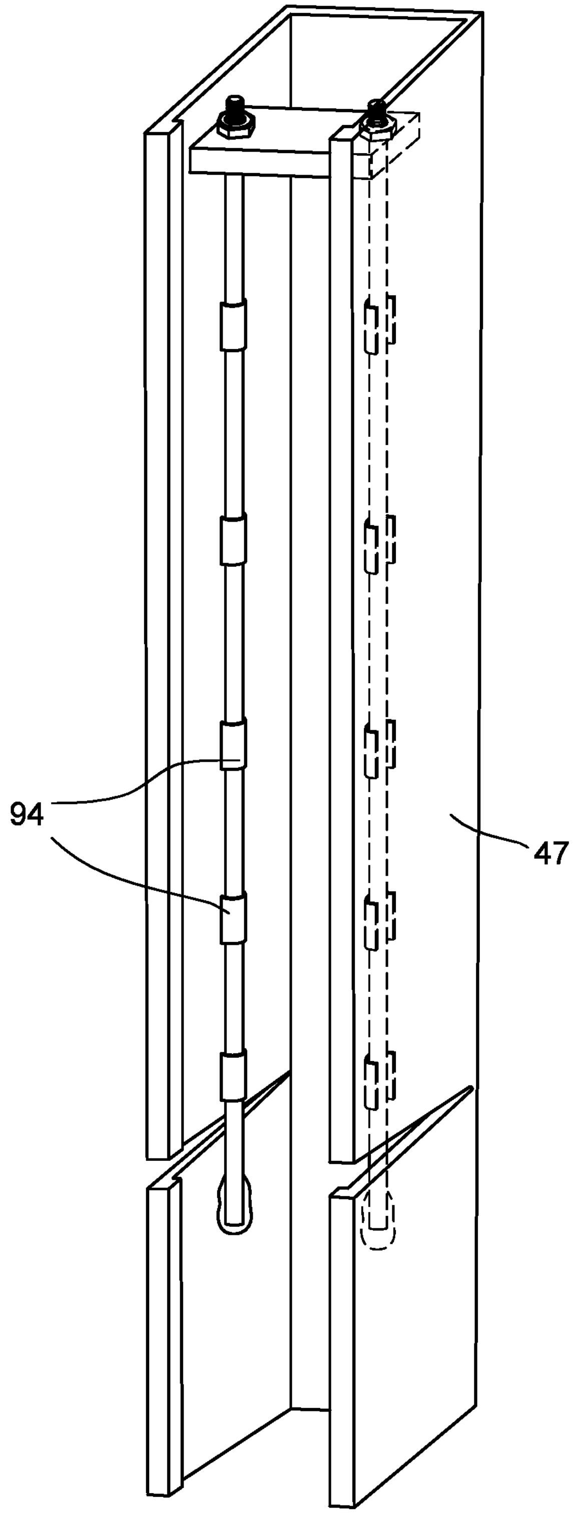
FIG. 10 illustrates a perspective view of a the embodiment of the internal components of the hinge post of FIG. 9 with a series of rod sleeves securing the tensioning rod.
Figure 11:
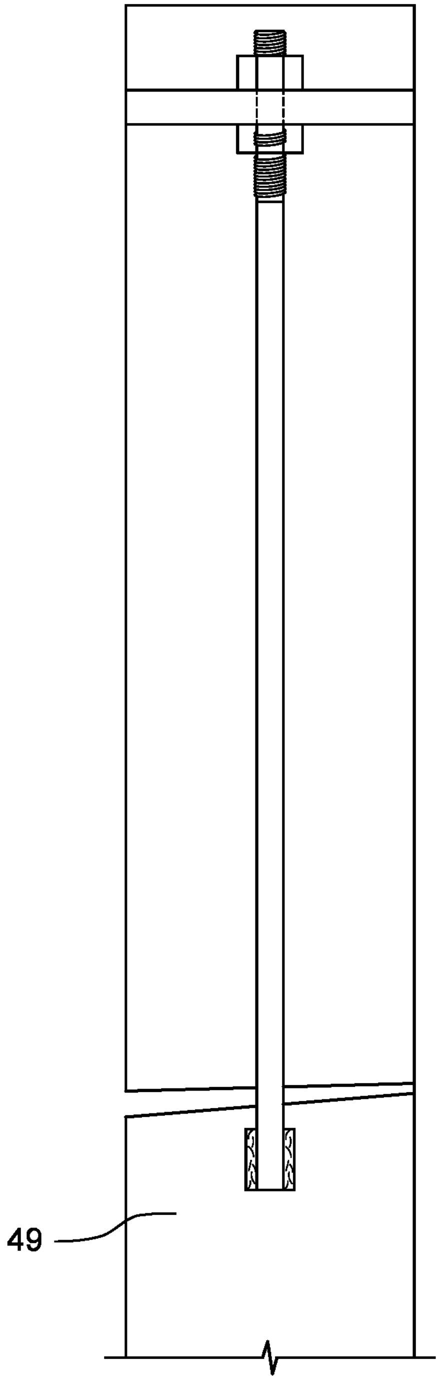
FIG. 11 illustrates an alternate embodiment of FIGS. 9-10 in which the nut is fixed and the rod travels to adjust the tension on the gate.

FIG. 10 illustrates the embodiment of FIG. 9 with a series of rod sleeves positioned on the arms of the upper channel 47. The rod sleeves 94 serve to retain the rods in position during use in conjunction with a nut 53 that rotates on the rod. In the embodiment shown in FIG. 11 the rod is fixed and does not rotate with the nut 55 of the upper plate 57 rotating on the rod, causing the plate to travel on the rod.

Figure 12:
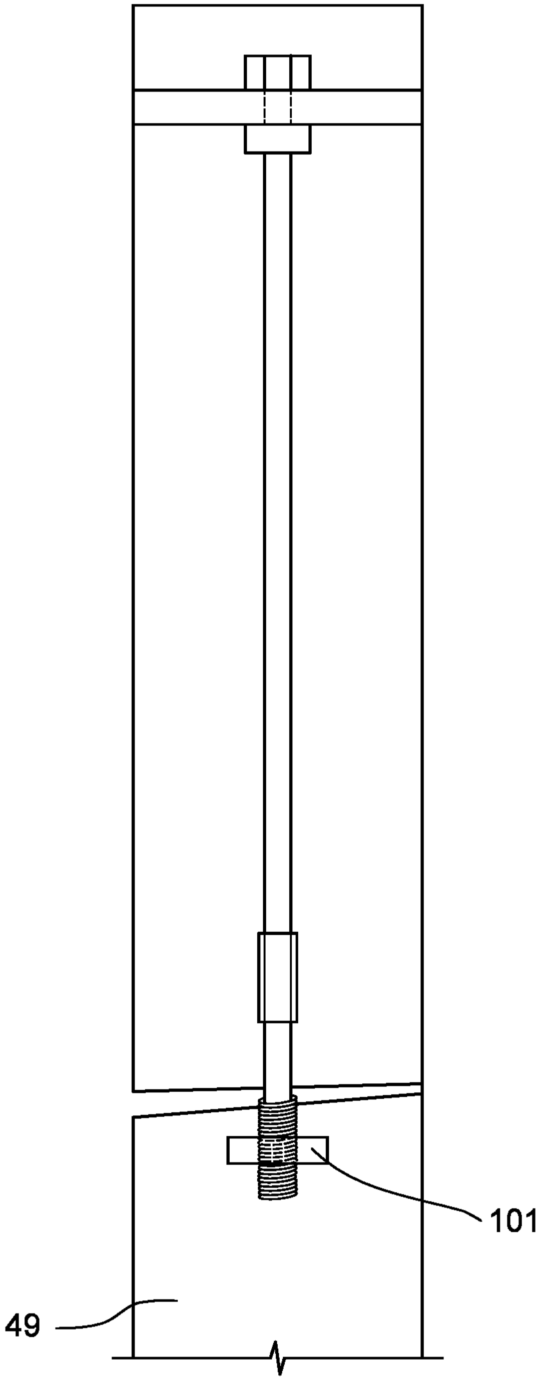
FIG. 12 illustrates a third embodiment of FIGS. 9 and 10 showing the rod and nut being uniform and rotating in a threaded rod sleeve to adjust tension in the gate.

FIG. 12 illustrates an embodiment in which the rod is fixed on the nuts, for example with the rod and nut being a single unitary piece. The rod rotates through the opening in the upper plate and rotates in threaded welded plate 101 positioned in the lower channel 49.

A variety of reliefs may be formed in each arm. Alternatively, different shaped channels may be utilized for facilitating use in different gate post cross sections. The insert may be utilized with a variety of fencing substrates such as steel, iron or vinyl.

While certain preferred embodiments are shown in the figures and described in this disclosure, it is to be distinctly understood that the presently disclosed inventive concept(s) is not limited thereto but may be variously embodied to practice within the scope of the following claims. From the foregoing description, it will be apparent that various changes may be made without departing from the spirit and scope of the disclosure as defined by the following claims.

What is claimed is:

1. An insert for a gate post, said insert comprising:

An insert body, said insert body configured for positioning within a hollow gate post, said body configured to extend along a length of the hollow gate post;

A relief formed in said body, said relief being positioned on a first side of a body, said relief defining an upper insert body positioned on an upper side of said relief and a lower insert body positioned on a lower side of said relief;

A tensioning mechanism, said tensioning mechanism connected to said lower insert body and extending to a connection to a position on said upper insert body, said tensioning mechanism providing support between said upper insert body and said lower insert body, said tensioning mechanism configured for adjustment to adjust the length of said tensioning mechanism between said upper insert body and lower insert body to adjust the position of the said upper insert body relative to said lower insert body.

2. The insert of claim 1 wherein said insert body comprises a U-shaped channel, wherein said gate post having a square cross section.

3. The insert of claim 1 wherein said tensioning mechanism comprises two threaded rods, wherein said threaded rods extend between said upper insert body and said lower insert body and are operatively connected to said upper insert body and said lower insert body to extend and compress said relief.

4. The insert of claim 3, wherein each of said rods comprises a nut configured for rotation to adjust said rods to compress and extend said relief.

5. The insert of claim 3 wherein said rods are operatively connected to said upper insert body by an upper plate.

6. The insert of claim 3 wherein said rods are operatively connected to said lower insert body by a lower plate.

7. The insert of claim 3 wherein said rods are configured to rotate to extend or compress said relief.

8. The insert of claim 3 wherein said threaded rods are connected to rod sleeves to connect said threaded rods to said lower insert body.

9. The insert of claim 1 wherein said tensioning mechanism is connected to said upper insert body and said lower insert body proximate to said relief.

10. The insert of claim 1 wherein said insert is positioned within a gate post.

11. An insert for a gate post, said insert comprising:

An insert body, said insert body comprising an upper insert body and a lower insert body, said insert body configured for positioning within a hollow gate post, said insert body configured to extend along a length of the hollow gate post;

A relief separating said upper insert body and said lower insert body such that said upper insert body and said upper insert body is configured to hingedly move toward or away from said lower insert body;

A tensioning mechanism, said tensioning mechanism connected to said lower insert body and extending to a connection to a position on said upper insert body, said tensioning mechanism providing support between said upper insert body and said lower insert body, said tensioning mechanism configured for adjustment to adjust the length of said tensioning mechanism between said upper insert body and lower insert body to adjust the position of the said upper insert body relative to said lower insert body.

12. The insert of claim 11 wherein said insert body comprises a U-shaped channel, wherein said gate post having a square cross section.

13. The insert of claim 11 wherein said tensioning mechanism comprises two threaded rods, wherein said threaded rods extend between said upper insert body and said lower insert body and are operatively connected to said upper insert body and said lower insert body to extend and compress said relief.

14. The insert of claim 13 wherein each of said rods comprises a nut configured for rotation to adjust said rods to compress and extend said relief.

15. The insert of claim 14 wherein said threaded rods are connected to rod sleeves to connect said threaded rods to said lower insert body.

16. The insert of claim 13 wherein said rods are operatively connected to said upper insert body by an upper plate.

17. The insert of claim 13 wherein said rods are operatively connected to said lower insert body by a lower plate.

18. The insert of claim 13 wherein said rods are configured to rotate to extend or compress said relief.

19. The insert of claim 11 wherein said tensioning mechanism is connected to said upper insert body and said lower insert body proximate to said relief.

20. The insert of claim 11 wherein said insert is positioned within a gate post.

* * * * *